United States Patent [19]

Lebsock

[11] Patent Number: 4,967,123
[45] Date of Patent: Oct. 30, 1990

[54] GYRO CONTROL AND MONITOR CIRCUIT

[75] Inventor: Robert A. Lebsock, Las Cruces, N. Mex.

[73] Assignee: The United States of America as represented by the Secretary of the Army, Washington, D.C.

[21] Appl. No.: 471,978

[22] Filed: Jan. 30, 1990

[51] Int. Cl.$^5$ ............................................. H02K 11/00
[52] U.S. Cl. .................................... 318/490; 318/565; 324/177; 324/158 MG
[58] Field of Search ................ 318/449, 490, 558, 565, 318/648, 651, 671; 324/522, 523, 160, 161, 162, 177, 71.1, 158 MG

[56] References Cited

U.S. PATENT DOCUMENTS

| | | |
|---|---|---|
| 3,146,433 | 8/1964 | Hurlburt . |
| 3,282,081 | 11/1966 | Boskovich . |
| 3,657,918 | 4/1972 | Hurlburt . |
| 3,790,874 | 2/1974 | Klimo ............................. 318/490 X |
| 3,851,324 | 11/1974 | De Boer et al. ................. 318/490 X |
| 3,942,111 | 3/1976 | Pfouts ............................. 318/490 X |
| 4,275,342 | 6/1981 | Kawada et al. ..................... 318/490 |
| 4,340,847 | 7/1982 | Izumi ................................. 318/490 |
| 4,422,040 | 12/1983 | Raider et al. .................... 318/490 X |
| 4,616,179 | 10/1986 | Braun . |

FOREIGN PATENT DOCUMENTS

| | | | |
|---|---|---|---|
| 1964555 | 8/1978 | Fed. Rep. of Germany ...... 318/490 |
| 52-26412 | 2/1977 | Japan ................................... 318/490 |

*Primary Examiner*—Bentsu Ro
*Attorney, Agent, or Firm*—Saul Elbaum; Guy M. Miller

[57] ABSTRACT

An energizing and test circuit for a gyroscope spin motor which in addition to having a set of energizing coils, also includes a reference coil which generates a sinusoidal voltage whose frequency is a function of speed of rotation of the spin rotor. This signal is fed to a precision tachometer circuit whose output is compared with a desired speed signal for generating a voltage required to maintain a proper spin rate and comprises what is referred to as a "sustain" voltage. The sustain voltage is buffered and coupled to an external test point which can be monitored to determine the functional integrity of the gyro and more particularly the quality of its motor bearings. This sustain voltage is also coupled to drive amplifier circuit means which power the head coil assembly including drive windings of the spin motor. Circuitry is also provided for performing an automated spin-up and spin-down test.

19 Claims, 2 Drawing Sheets

GYRO CONTROL AND MONITOR CIRCUIT

ORIGIN OF THE INVENTION

This invention was made by an employee of the United States Government. Accordingly, the Government may practice the invention without payment of any royalties thereon or therefor, and replace in lieu thereof.

RIGHTS OF THE GOVERNMENT

The invention described herein may be manufactured, used and licensed by or for the U.S. Government for Governmental purposes without payment to me of any royalty thereon.

BACKGROUND OF THE INVENTION

1. Field of the Invention

This invention relates generally to apparatus for testing electric motors and more particularly to a means for electrically testing and monitoring the mechanical integrity of a gyroscope.

Circuits for monitoring the performance of an electric motor including a gyroscope are generally known. As it pertains to determining the mechanical integrity of a gyroscope, rotor bearing failure has been found to be one of the major causes of inaccuracies in the operation of the gyroscope. Bearing failure is normally not characterized by a catastrophic failure which is accompanied by a sudden deceleration from its normal or rated operating speed, but usually exhibits a gradual reduction in the running speed of the gyroscope rotor over a given period of time. A typical method of determining bearing quality is accomplished by running the gyro up to its normal operating speed and then measuring the spin-down time by sensing the back EMF generated thereby until a rotor coasts to a stop or some other designated speed below the noted operating speed. During the spin-down time, bearing noise is also detected and subjectively evaluated.

Accordingly, it is an object of the present invention to provide an improvement in means for monitoring the performance of an electric motor.

It is a further object of the invention to determine the quality of the spin motor utilized in a gyroscope.

It is yet another object of the invention to provide an electrical circuit which operates to generate an analog voltage output which is related to the condition of the bearings in a gyroscope spin motor.

It is still a further object of the invention to provide and monitor the sustaining voltage required to keep a gyro spin motor spinning at its required operating speed and generate a first type sustained voltage output for a high quality gyro while producing a second type of sustained voltage output for a poor quality gyro.

And it is yet a further object of the invention to provide a gyro control and monitor circuit which includes an automated spin-up and spin-down test capability.

Summary

The foregoing and other objects are fulfilled by an energizing and test circuit for a gyroscope spin motor which in addition to having a set of energizing coils, also includes a reference coil which generates a sinusoidal voltage whose frequency is a function of speed of rotation of the spin rotor. This signal is fed to a precision tachometer circuit whose output is compared with a desired speed signal for generating a voltage required to maintain a proper spin rate and comprises what is referred to as a "sustain" voltage. The sustain voltage is buffered and coupled to an external test point which can be monitored to determine the functional integrity of the gyro and more particularly the quality of its motor bearings. This sustain voltage is also coupled to drive amplifier circuit means which power the head coil assembly including drive windings of the spin motor. Circuitry is also provided for performing an automated spin-up and spin-down test.

BRIEF DESCRIPTION OF THE DRAWING

The following detailed description of the invention will be made more fully understood when considered in conjunction with the following drawing wherein.

DETAILED DESCRIPTION OF THE INVENTION

Figure 1A:
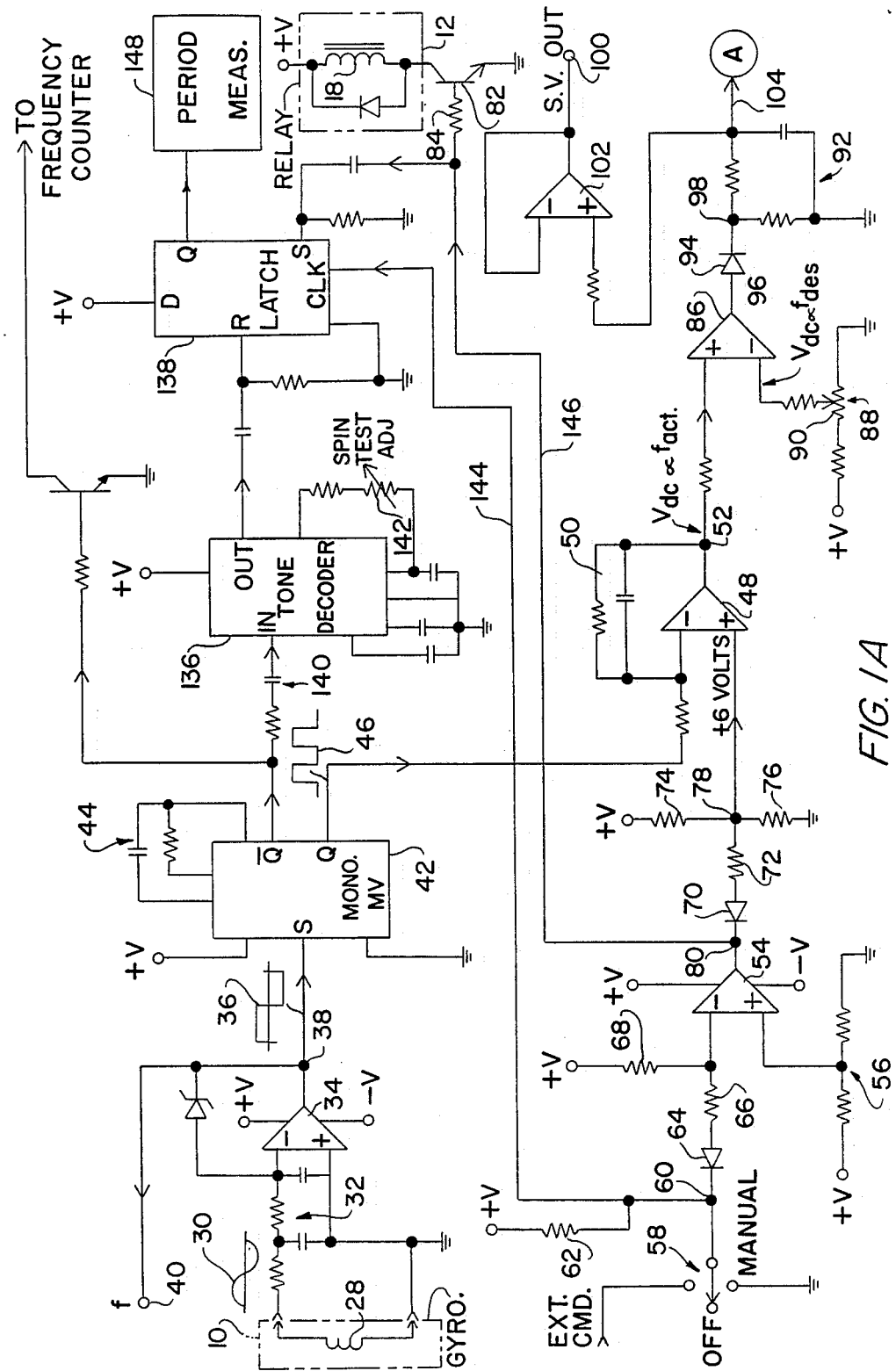
FIGS. 1A and 1B disclose an electrical schematic diagram illustrative of the preferred embodiment of the invention.

Referring now to the drawings, the gyro control and monitor circuit is electrically connected to an electric motor in the form of a gyroscope spin motor or simply a "gyro" 10 through a relay 12 having two sets of contacts 14 and 16 (FIG. 1B) controlled by a coil 18 (FIG. 1A). The gyro 10 is shown including four quadrature drive windings 20, 22, 24 and 26, four magnetic reed switches S1, S2, S3, and S4 (FIG. 1B) placed in quadrature and a reference coil 28 shown in FIG. 1A.

The rotational speed of the gyro spin motor, not shown, ranges, for example, between 4200 and 8400 rpm. This frequency of rotation is sensed by the reference coil 28 which generates a sinusoidal waveform 30 thereacross and which comprises a frequency ranging between 70 and 140 Hz.

Figure 1B:
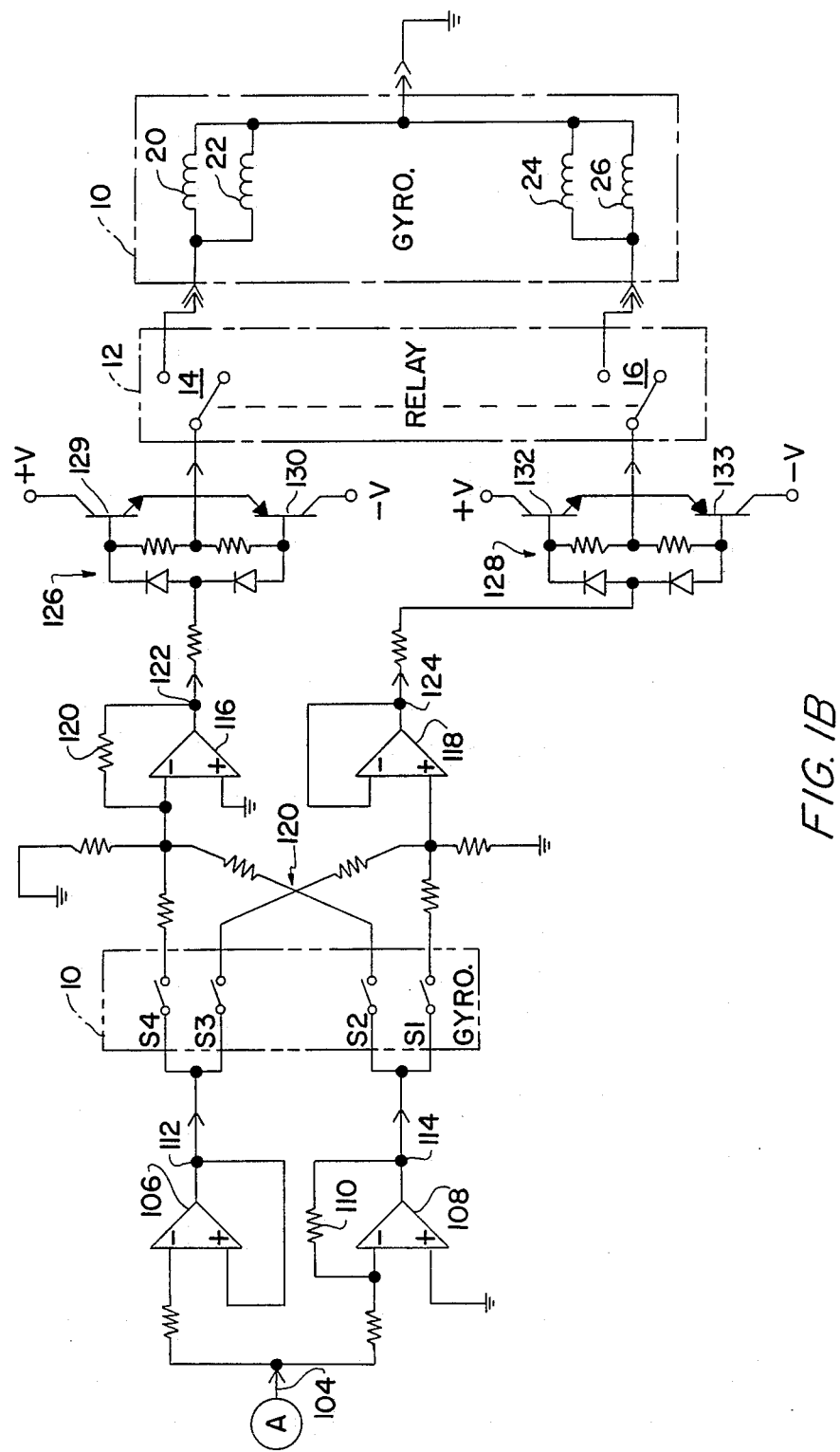

The description of the control and monitor circuit proceed first from the reference coil 28 in FIG. 1A to the circuitry of the relay 12 shown in FIG. 1B. As shown, a resistance-capacitance filter network 32 is coupled between one side of the reference coil 28 and the inverting (−) input of an operational amplifier 34 whose non-inverting (+) input is connected, along with the other side of the coil 28, to a point of reference potential illustrated as ground. The operational amplifier 34 operates as a voltage limiter to generate a squarewave output 36 which appears at circuit node 38 and which has a frequency content the same as the sinusoidal output 30 of the reference coil 28. This reference frequency signal f is also connected to an output test point 40 for external display and/or measurement.

The squarewave 36 is fed to the S input of a monostable multivibrator having a time constant as controlled by the R-C network 44 and which generates complementary squarewave outputs of twice the frequency f at the terminals Q and Q̄ as shown by the waveform 46. The Q output of the monostable multivibrator 42 is fed to the inverting input (−) of an operational amplifier (op. amp.) 48 which is configured as an integrator by virtue of the parallel combination of the R-C network 50 connected between the output and the inverting input (−) thereof. The combination of the monostable multivibrator 42 and the integrator amplifier 48 form a precision tachometer which converts the frequency appearing at circuit node 38 into a DC voltage linearly proportional to spin motor frequency f at circuit node 52.

The non-inverting input (+) of the integrator amplifier 48 is connected to a command interface and start-up circuit which includes, among other things, an operational amplifier 54 whose non-inverting input (+) is connected to a resistance voltage divider network coupled across a source of positive potential (+V) and ground. The inverting (−) input of the operational amplifier 54 is connected to a single pole, three position switch 58 which includes a "manual" start position, an "external start command" position (ext.cmd.) and an "off" position which comprises an unconnected terminal.

Circuit node 60 which is connected to the wiper of the switch 58 is also connected to a source of positive potential (+V) by means of a fixed resistor 62. A semiconductor diode 64 couples the circuit node 60 to the inverting (−) input of the operational amplifier 54 via a coupling resistor 66. A bias resistor 68 connected to the source of positive potential (+V) is also connected to the (−) input of op. amp. 54. The output of the operational amplifier 54 is coupled to the non-inverting input (+) of the previously mentioned integrator amplifier 48 by means of the semiconductor diode 70, a coupling resistor 72 and a pair of level setting resistors 74 and 76. A source of both a positive (+V) and negative (−V) supply voltage is also coupled to op. amp. 54.

In operation, the output of the operational amplifier 54 at circuit node 80 is either a maximum positive or maximum negative voltage. In the uncommanded mode, i.e. the "off" position, circuit node 80 is at a negative potential which inhibits the operation of the relay coil 18 through the series connected N-P-N transistor 82 which has its base electrode connected to circuit node 80 by means of the coupling resistor 84. This also forces a negative bias on the non-inverting (+) input of the integrator amplifier 48.

When the switch 58 is placed in either of the other two start positions, the output at circuit node 80 becomes positive. This operates to activate the relay coil 18 by rendering the transistor 82 conductive while back biasing the diode 70. This also permits the bias at the non-inverting (+) input of the integrator amplifier 48, as determined by voltage dividing action of resistors 74 and 76, to reach a predetermined level, for example, +6 volts. The gyro 10 then becomes energized and as it speeds up, the voltage level applied to the inverting (−) input of the integrator amplifier increases in a positive direction. When the voltage at the (−) input of the integrator amplifier 48 reaches the same level present at the (+) input, e.g. +6 volts, the output voltage which appears at circuit node 52 goes to zero. This comprises the maximum commanded gyro rotational speed achievable.

The output of the integrator amplifier 48 is next coupled to the non-inverting input (+) of an operational amplifier 86 configured as a comparator amplifier by virtue of having its inverting (−) input coupled to a spin motor speed control circuit comprised of a resistance voltage divider network 88, including a potentiometer 90, coupled across a source of positive potential (+V). The op. amp. 86, however, is designed to have a sufficient gain to saturate the output thereof to a positive voltage level. This signal is then coupled to a R-C filter network 92 via the semiconductor diode 94. The voltage applied to the (−) input of the operational amplifier 86 is adjustable by potentiometer 90 so that rotational speed can be set by the user.

Accordingly, as the speed of the gyro 10 increases, the voltage at circuit node 52 decreases as does the voltage coupled to the (+) input of amplifier 86. At some point the voltage at the (+) and (−) inputs become substantially equal whereupon the output on circuit lead 96 tends to go to zero volts; however, this voltage never becomes zero when the gyro is being driven because a small error voltage is always present at the output of the operational amplifier 86 on circuit lead 96 due to bearing friction and gyro drag. This voltage is known as the "sustain voltage" and comprises the voltage necessary to sustain the gyro spin motor at the desired rotational speed. The sustain voltage is always positive and is directly related to the quality of the gyro being driven, being small for a high quality gyro and relatively high for a poor quality gyro. The diode 94 assures that the voltage at circuit node 98 is always positive. However, it additionally acts as a circuit protective element which limits possible damage to the following stages to be described should a component failure occur.

The voltage present at circuit 98 node accordingly is filtered by the R-C filter network 92 and is coupled to a test point 100 through a unity gain amplifier 102 which acts as a buffer for the sustain voltage present at the test point 100 and assures that any test instrumentation coupled thereto does not disturb the sustain voltage which is also coupled to the control unit shown in FIG. 1B via circuit lead 104.

Referring now to FIG. 1B, the sustain voltage present on circuit lead 104 is coupled to the inverting (−) inputs of a pair of unity gain operational amplifiers 106 and 108. The output of op. amp. 106 is coupled directly back to the non-inverting (+) input thereof to form a non-inverting unit gain voltage follower, while the output of the other op. amp. 108 is coupled back to its inverting (−) input via the feedback resistor 110 to provide an inverting unity gain amplifier. The signals present at the output circuit nodes 112 and 114 of the op. amps. 106 and 108 comprise two voltage levels of the same magnitude but of the opposite polarity.

Next each of the output signals from the unity gain operational amplifiers 106 and 108 are coupled to the four magnetic reed switches S1, S2, S3 and S4 contained inside of the gyro 10 and the activator coil assembly thereof. The switches S1 . . . S4 are positioned so that a proper polarity voltage is always coupled to a pair of operational amplifiers 116 and 118 which function as drive preamplifiers (preamps.) via the cross coupling resistor network 120 coupled to the (−) and (+) inputs, respectively, of the preamps 116 and 118. The output of the preamp. 116 is coupled back to the inverting (−) input via a fixed resistor 120 to provide an inverting unity gain amplifier, while the output of amplifier 118 is connected directly back to the inverting (−) input to provide a non-inverting unity gain voltage follower in the same manner as the input op. amps. 106 and 108.

As the spin motor of the gyro 10 rotates, each switch S1 . . . S4 opens and closes, producing a chopped DC voltage which is applied to the inputs of the drive preamplifiers 116 and 118. The output of each driver preamp. 116 and 118 appearing at circuit nodes 122 and 124 is bipolar. The magnitude of these voltages is the same as the sustain voltage that appears on the sustain voltage output test point 100 (FIG. 1A). This voltage contains switching transients when the gyro 10 is rotating at the desired speed, but is a square wave during the time the gyro is speeding up. The outputs of the two drive preamps. 116 and 118 are coupled to respective drive amplifier stages 126 and 128, each of which consists of a complementary pair of Darlington power transistors 129, 130 and 132, 133, configured as class B amplifiers.

Further as shown in FIG. 1B, the drive amplifier stage 126 drives gyro coils 20 and 22 through the set of relay contacts 14, when closed, while drive amplifier stage 128 energizes coils 24 and 26 through relay contacts 16, when closed. The drive coils 20, 22 and 24, 26 are positioned such that only two class B driver amplifiers are required to completely satisfy the drive requirements, i.e. the energization, of the four drive coils.

The relay contacts 14 and 16 are placed intermediate the driver stages 126 and 128 and drive coils 20, 22, 24 and 26 so as to isolate these components from one another during a spin-down test, to be described, due to the fact that when the gyro 10 spins without being driven, i.e. in the "off" position of switch 58 (FIG. 1A), the voltage generated by the rotating spin motor of the gyro 10 would be fed back into the power amplifiers 126 and 128, in effect producing a reverse electromotor force or back emf. The back emf is used as a means of applying a drag to a gyro which is rotating beyond the desired speed. This condition is desirable in the control of the gyro to the commanded rotational speed, but is not desirable for performing a spin-down test. Thus contacts 14 and 16 are opened by degenerization of the relay coil 18 when a spin-down test is desired.

A spin-down test is used to determine gyro quality by measuring the time period required for the gyro spinning at its rated speed to spin down to a percentage of rated speed. Normally this consists of an operator utilizing a frequency counter and a stop watch; however, this method is quantitative at best.

The circuitry shown in FIG. 1A accordingly also includes an improvement comprising means for providing both an automated spin test capability including both a spin-down and a spin-up test. The automated spin test comprises incorporating a tone decoder integrator integrated circuit module 136 and a latch type flip-flop circuit 138. The input terminal of the tone decoder 136 is coupled to the $\overline{Q}$ output of the monostable multivibrator 42 by means of the resistor-capacitor coupling network 140 and receives an inverted version of the waveform 46 which as noted above comprises a signal which is twice the reference frequency f of the spin motor. The output of the tone decoder 136 changes its binary logic state whenever the input frequency matches the set point frequency as manually set by the potentiometer 142. The change in logic state is coupled to the reset R input of the flip-flop 138 following an enabling signal being applied to the clock CLK input received from the command input interface circuit node 60 via circuit lead 144 and a set signal applied to the S input from circuit node 80 via circuit lead 146. In operation, the flip-flop 138 performs the function of a latch for the information propagated by the sequence of events. The latched information contains period information which can be detected and measured by an elapsed time or period measurement circuit 148 connected, for example, to the Q output of the flip-flop 138.

A typical sequence of events for use of the automated spin test circuit is as follows. A start command is first initiated which forces the latch circuit 138 into the set mode by a positive signal coupled from the output of op. amp. 54 and circuit node 80 to the S input thereof. This is followed by the attainment of the set point spin frequency as sensed by the tone decoder 136, which is then followed by forced reset of the flip-flop 138 by a signal applied to its R input from the tone decoder 136. This consists of the spin-up portion of the automated test. The measurement circuit 146 measures the period between the changes in the logic state produced by the flip-flop 138. The spin-down is the reverse of this process, with the sequence being: first the removal of the command as sensed by the S input of the flip-flop 138, forcing a set condition thereof. This is followed by a decrease of spin frequency to a point set by the potentiometer 90 and sensed by the tone decoder 136, again accompanied by a forced reset of the flip-flop 138. Again the period is measured by the external period measurement 146.

Thus what has been shown and described is a real time system for monitoring the wear rate and/or lubrication problems associated with the spin motor of a gyroscope. Thus a test engineer, for example, is able to constantly monitor the gyro assembly for signs of bearing wear or other mechanical degradations such as lubrication, viscosity, as a function of temperature and age while in operation and without removal from the system with which it is being used. It should be pointed out that the circuitry thus shown is not limited to a gyroscope spin motor, but can be used with any rotating motor operating at a regulated speed where the drive voltage amplitude is a function of the driven mode.

Having thus shown and described what is at present considered to be the preferred embodiment thereof, it should be noted that the same has been made by way of illustration and not limitation. Accordingly, all modifications, alterations and changes coming within the spirit and scope of the invention are herein meant to be included.

I claim:

1. A method for electrically testing an electric motor for mechanical integrity while being energized, comprising:
   generating a signal having a parameter which is a function of actual motor speed;
   generating a signal having a parameter which is a function of desired motor speed;
   comparing both said signals and generating therefrom a sustain voltage for driving said motor at a predetermined speed;
   applying said sustain voltage to said motor; and
   monitoring said sustain voltage to determine mechanical integrity of said motor whereby a relatively low magnitude thereof is indicative of a high quality motor, whereas a large voltage is indicative of a poor quality motor.

2. The method as defined in claim 1, wherein said step of generating a sustain voltage comprises the step of generating a sustain voltage for driving said motor at its rated speed.

3. The method as defined by claim 1, wherein said motor comprises the spin motor of a gyroscope.

4. The method as defined by claim 1, wherein said parameter which is a function of actual motor speed comprises a signal having a frequency proportional to actual motor speed.

5. The method as defined by claim 4, wherein said signal having a frequency proportional to the actual motor speed comprises an AC signal and wherein said signal having a parameter which is a function of desired motor speed is a DC voltage proportional to the desired motor speed.

6. A method for electrically testing an electric motor for mechanical integrity while being energized, comprising:
   generating a signal having a parameter which is a function of actual motor speed which comprises an AC signal having a frequency proportional to the actual motor speed;
   generating a squarewave signal from said AC signal;
   integrating said squarewave signal to generate a DC signal linearly proportional to the actual motor speed;
   generating a signal having a parameter which is a function of desired motor speed which is a DC voltage proportional to the desired motor speed;
   comparing said DC signal that is linearly proportional to the actual motor speed with said DC voltage that is proportional to the desired motor speed and generating therefrom a sustain voltage for driving said motor at a predetermined speed;
   applying said sustain voltage to said motor; and
   monitoring said sustain voltage to determine the mechanical integrity of said motor whereby a relatively low magnitude thereof is indicative of a high quality motor, whereas a large voltage is indicative of a poor quality motor.

7. A circuit for electrically controlling and monitoring the quality of a gyroscope having a spin motor, a set of energizing coils therefor, and a reference coil generating an electrical signal in response to the spin motor rotation, comprising:
   tachometer circuit means coupled to said reference coil and being enabled to generate a signal proportional to the frequency of said electrical signal generated by said reference coil and thus the actual rotational speed of said spin motor;
   start-up circuit means coupled to said tachometer circuit means for enabling both said tachometer circuit means and the operation of said spin motor;
   first circuit means for generating a signal proportional to a desired speed of said spin motor;
   second circuit means responsive to said signal proportional to said actual rotational speed and to said signal proportional to said desired speed and generating therefrom a voltage for sustaining the speed of said spin motor at said desired speed;
   third circuit means coupled between said second circuit means and said spin motor for applying the sustaining voltage to said spin motor; and
   fourth circuit means coupled to said second circuit means for detecting and maintaining the sustaining voltage, whereby a first voltage condition thereof is indicative of a high quality gyroscope and a second voltage condition is indicative of a poor quality gyroscope.

8. The circuit as defined by claim 7 and further comprising fifth circuit means responsive to the electrical signal generated by said reference coil for controlling an automated spin test of said spin motor.

9. The circuit as defined by claim 7, wherein said electrical signal generated by said reference coil comprises an AC signal and wherein said tachometer circuit means includes:
   means for converting said AC signal to a squarewave signal;
   multivibrator circuit means coupled to and being responsive to said squarewave signal for generating a squarewave output signal related in frequency to said electrical signal generated by said reference coil; and
   an integrator circuit means coupled to said multivibrator circuit means for generating a DC signal proportional to the speed of said spin motor.

10. The circuit as defined by claim 9, wherein said multivibrator circuit means comprises a monostable multivibrator circuit and generating said squarewave output signal having a frequency which is a multiple of said AC signal generated by said reference coil.

11. The circuit as defined by claim 10, wherein said integrator circuit means includes a first amplifier means having first and second inputs, said first input being coupled to said squarewave output signal of said multivibrator circuit and said second input being coupled to said start-up circuit means.

12. The circuit as defined by claim 11, wherein said start-up circuit means includes:
   switch means for commanding at least one start mode and a stop/off mode,
   second amplifier means having a pair of inputs and an output, one of said pair of inputs being coupled to a first bias voltage and said switch means, the other of said pair of inputs being coupled to a second bias voltage, and said output being coupled to said second input of said first amplifier means.

13. The circuit as defined by claim 12 and further including additional circuit means coupling said output of said second amplifier means to said second input of said first amplifier means and comprising a voltage divider coupled across a source of supply voltage and having a circuit node connected to said second input of said first amplifier means, and a diode coupled between said output of said second amplifier means and circuit node.

14. The circuit as defined by claim 12 further comprising a spin test circuit, said spin test circuit comprises:
   a digital tone decoder circuit coupled to said multivibrator circuit means and being operable to change its output state in response to a predetermined set point frequency;
   a digital latch circuit coupled to said start-up circuit means for being set to a first output state in response to a start/stop signal therefrom and to said multivibrator circuit means for being reset by said change in output state thereof; and
   time measurement circuit means coupled to said latch circuit for determining elapsed time between said start/stop signal and the change of output state of said digital tone decoder circuit.

15. The circuit as defined by claim 11, wherein said second circuit means comprises a DC voltage comparator circuit having first and second inputs, said first input being coupled to said DC signal proportional to the speed of said spin motor and said second input being coupled to a DC signal corresponding to said desired speed of said spin motor.

16. The circuit as defined by claim 15, wherein said DC voltage comparator circuit comprises another amplifier means including said first and second inputs and having an output coupled to said third and fourth circuit means.

17. The circuit as defined by claim 16 and additionally including unidirectional diode circuit means coupled between said output of said another amplifier means and said third and fourth circuit means for coupling a signal of single polarity thereto.

18. The circuit as defined by claim 17 and additionally including signal filter circuit means coupled between said diode circuit means and said third and fourth circuit means.

19. The circuit as defined by claim 17, wherein said fourth circuit means comprises a buffer amplifier including amplifier means having an output coupled to a sustain voltage output test point for monitoring the sustaining voltage.

* * * * *